May 31, 1949.　　　　　　　J. GREGG　　　　　　　2,471,739
METHOD OF AND APPARATUS FOR MAKING MOLDED ARTICLES
Filed Aug. 11, 1945　　　　　　　　　　　　　3 Sheets-Sheet 1
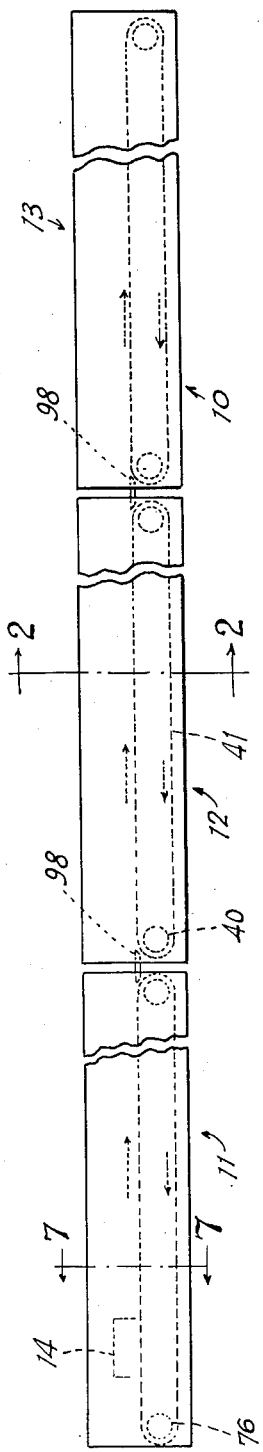
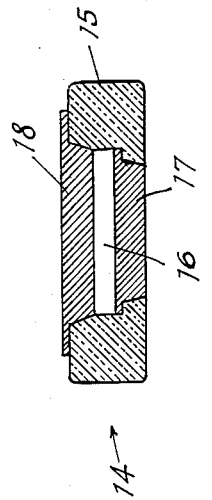
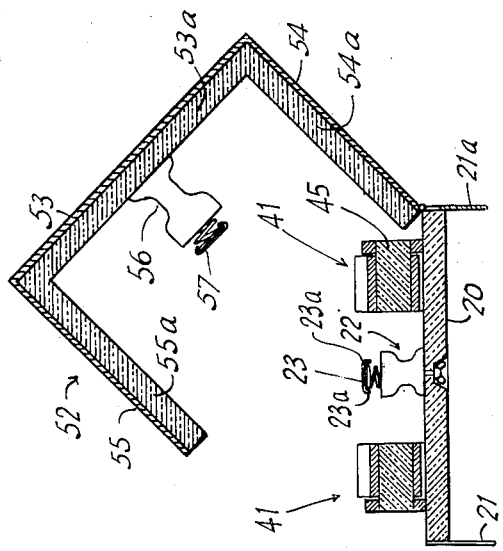
INVENTOR
Jon Gregg
BY
ATTORNEY May 31, 1949.  J. GREGG  2,471,739
METHOD OF AND APPARATUS FOR MAKING MOLDED ARTICLES
Filed Aug. 11, 1945  3 Sheets-Sheet 2
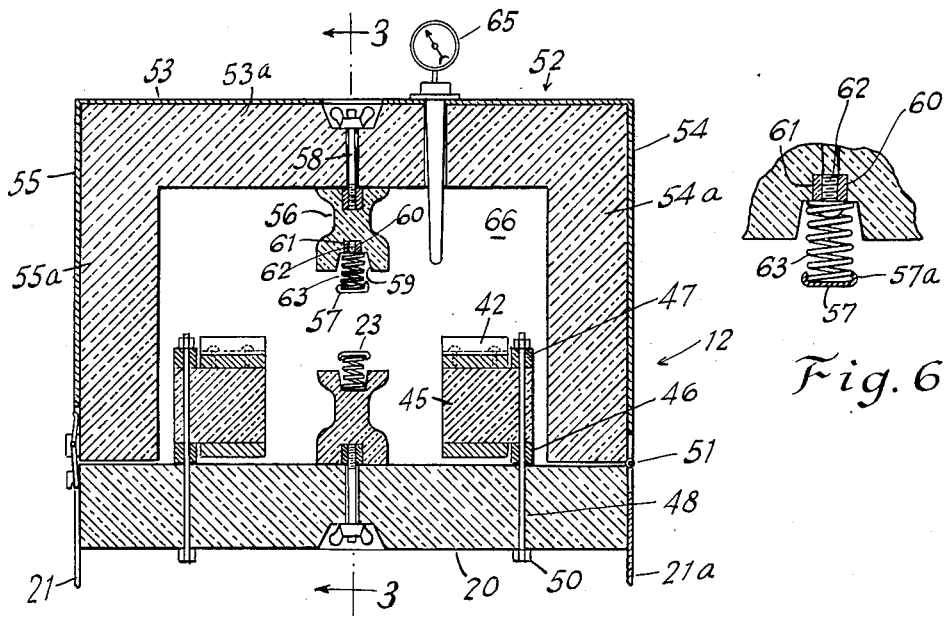
Fig. 2
Fig. 6
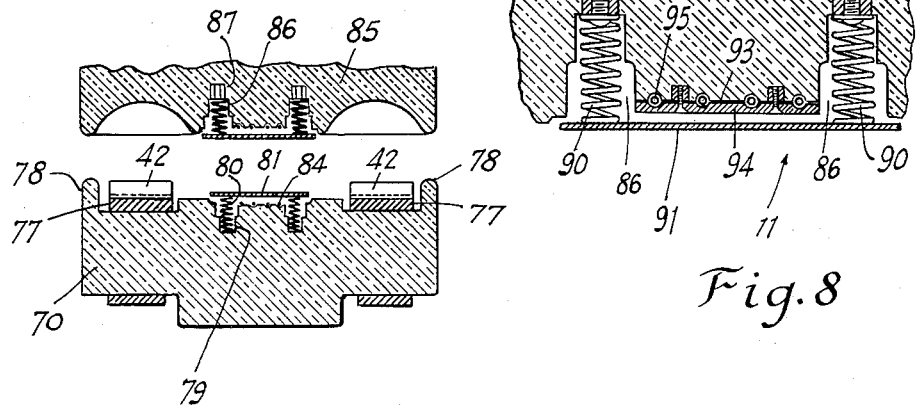
Fig. 7
Fig. 8
INVENTOR
Jon Gregg
BY
J. B. Felshin
ATTORNEY May 31, 1949. J. GREGG 2,471,739
METHOD OF AND APPARATUS FOR MAKING MOLDED ARTICLES
Filed Aug. 11, 1945 3 Sheets-Sheet 3

INVENTOR
Jon Gregg
BY
ATTORNEY

Patented May 31, 1949

2,471,739

UNITED STATES PATENT OFFICE 2,471,739

METHOD OF AND APPARATUS FOR MAKING MOLDED ARTICLES

Jon Gregg, New Hope, Pa.

Application August 11, 1945, Serial No. 610,261

20 Claims. (Cl. 18—4)

This invention relates to methods of and apparatus for making molded articles. It is particularly directed to molding by use of high frequency current passed through the article to be molded.

An object of this invention is to provide a method of the character described comprising preheating a mold, then subjecting the article to be molded in the mold to high frequency current, and thereafter post-heating the mold.

The mold has top and bottom conductor plates at the top and bottom of the mold cavity. The preheating of the mold is for the purpose of having the top and bottom plates at a temperature equal to or slightly higher than the temperature to which the article to be molded is heated in the high frequency apparatus, because unless the top and bottom plates are at such temperature, the high frequency apparatus will cause all of said article to reach curing or molding temperature at exactly the same time, and should the conductor surfaces contacting said article not be at said temperature, these surfaces will extract heat from the surfaces of the article, contiguous thereto, and reduce the temperature of such surfaces below the proper curing or molding temperature, or at least below the temperature existent in the interior of the molded article, thereby retarding, if not arresting, the curing or molding process adjacent such surfaces. In accordance with the present invention, the top and bottom plates, above and below the cavity, constitute terminals forming part of the circuit in the high frequency apparatus embodying the invention. These terminals are preheated.

The purpose of the high frequency current is to heat the article to be molded to curing temperature or to plasticizing or fusing temperature, which permits start of the curing quickly since the high frequency current brings the temperature of the article to be molded, to curing temperature quickly. The high frequency current is applied to each mold only for sufficient time to bring the article to be cured or molded to curing temperature.

The purpose of the post-heating is to keep the two metal terminals or plates above and below the mold cavity, at curing temperature or slightly higher so as to retain the article molded at curing temperature. The mold in accordance with the present invention is post-heated until the rubber or other plastic material is plasticized, molded or cured.

Another object of this invention is to provide a highly improved apparatus of the character described including means for preheating a mold while the mold is carried on a conveyor, and means for conveying the mold through a high frequency apparatus where the article to be molded is subjected to high frequency current, and means to convey the mold through a post-heater.

Another object of this invention is to provide high frequency apparatus of the character described, including a conveyor, and a mold carried by the conveyor and provided with top and bottom plates at the top and bottom of the mold cavity and constituting terminals in contact with bus bars connected to a high frequency generator.

Another object of this invention is to provide a high frequency apparatus of the character described, including a sectional cover member which may be uncovered in sections to expose the molds carried by the conveyor.

Yet another object of this invention is to provide an improved apparatus of the character described, including a preheater, a conveyor to carry the molds through the preheater to a high frequency apparatus, a high frequency apparatus, including a conveyor to receive the molds from the preheater, and carrying the molds through the high frequency apparatus, and a post-heater including a conveyor to take the molds from the high frequency apparatus and move the latter through the post-heater.

Still another object of this invention is to provide a strong and durable apparatus of the character described which shall be economical to operate, which shall be smooth and positive in operation, and yet practical and efficient to a high degree in use.

Still another object of this invention is to provide a highly improved process of the character described which shall be simple and easy to carry out, which shall make good molded objects with a minimum of labor, and saving in time and costs.

Other objects of this invention will in part be obvious and in part hereinafter pointed out.

The invention accordingly consists in the combination of steps, features of construction, combinations of elements, and arrangement of parts which will be exemplified in the method and apparatus hereinafter described, and of which the scope of application will be indicated in the following claims.

In the accompanying drawing, in which is shown one of the various possible illustrative embodiments of this invention, Fig. 1 is a side elevational view of apparatus embodying the invention;

Fig. 2 is an enlarged cross-sectional view taken on line 2—2 of Fig. 1;

Fig. 5 is a view similar to Fig. 3 but showing the top cover opened;

Fig. 6 is an elevational cross-sectional view of one of the bus bars;

Fig. 7 is a partial cross-sectional view taken on line 7—7 of Fig. 1;

Fig. 8 is an enlarged partial view of a portion of the apparatus shown in Fig. 7; and Fig. 9 is a sectional view of a mold used in apparatus embodying the invention.

Figure 4:
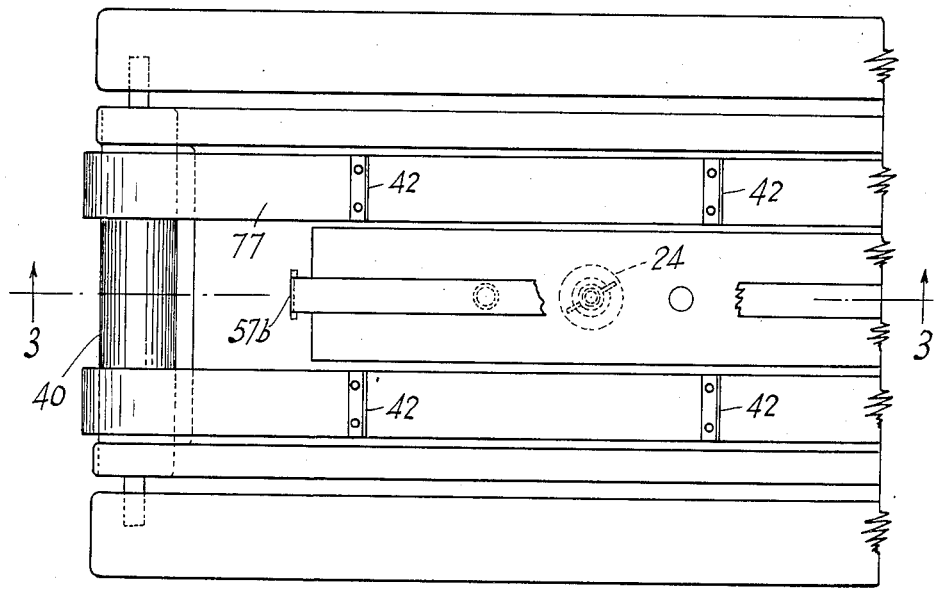
Fig. 4 is a cross-sectional view taken on line 4—4 of Fig. 3.
Figure 3:
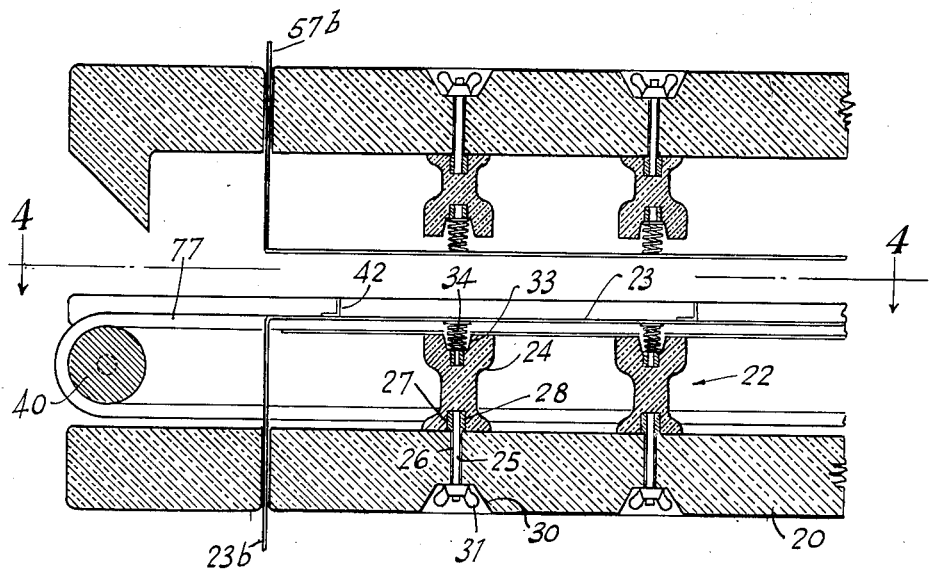
Fig. 3 is a partial cross-sectional view taken on line 3—3 of Fig. 2.

Referring now in detail to the drawing, 10 designates apparatus embodying the invention. The same comprises generally of a preheater 11, a high frequency apparatus 12, and a post-heater 13. The apparatus 10 is for molding articles in a mold of the type shown in my co-pending application Serial No. 610,262 filed on even date herewith. A mold of this type is shown in Fig. 9 indicated by numeral 14. The mold comprises generally of a body 15 made of heat resisting, insulating material such as ceramics and is formed with a mold cavity 16. It is furthermore provided with a bottom plate 17 made of metal and a combination metal top plate and ram 18 for the top of the mold cavity. The bottom and top plates serve as terminals to engage bus bars in high frequency apparatus 12 as will appear hereinafter.

In accordance with the process comprising the present invention, the material or article to be molded is placed in the mold cavity 16 where it is maintained under vertical as well as horizontal or side pressure. Any suitable article may be molded with the improved apparatus described herein. For example, there may be molded by means of this apparatus a sole such as shown and described in my Patent No. 2,361,938 issued November 7, 1944. Such a sole comprises a braid strip of fibrous material wound together with uncured rubber or thermoplastic material into the general shape of a sole. The purpose of molding is to cure the rubber or fuse the thermoplastic material under heat and pressure so as to cause the plastic material to penetrate the fibers of the braid and integrate the windings into a sole. To cure the rubber or to plasticize the thermoplastic material, such material must be brought to a predetermined curing or fusing temperature. In accordance with the present invention, the mold is preheated in the preheater 11. It then passes through a high frequency apparatus 12 and then passes through the post-heater 13. This process permits economical belt line heating method which is continuous with the curing as will appear hereinafter. The preheater is for the purpose of having the top lid and ram and the bottom plate of the mold at a temperature equal to or slightly above the temperature to which the sole or other article to be molded will be heated in the high frequency apparatus 12. The high frequency apparatus will cause all of the sole or like article to reach curing temperature at exactly the same time. Should the two metal surfaces of the top lid and ram and the bottom plate not be at said temperature, these surfaces will exact or withdraw heat from the surfaces of the sole or like article contiguous thereto and reduce the temperature of said surfaces below the proper curing temperatures or at least below the temperature in the interior of the sole, thereby retarding or perhaps arresting the curing at the surfaces. The purposes of the high frequency is to heat the sole to curing temperature which permits the start of the curing more quickly since the high frequency brings the temperature of the sole to curing temperature quickly. The high frequency current is "on" for the time necessary to bring the sole or like article to curing temperature. The post-heater keeps the two metal electrodes of the plate or mold at curing temperature or slightly higher, thereby keeping the sole at curing temperature without loss of heat. The mold is kept in the post-heater for a length of time to cure the rubber or thoroughly plasticize the thermoplastic material. It will thus be seen that the purpose of the preheater is to heat the molds and not the stock or article to be molded.

The high frequency apparatus 12 comprises an elongated base or table 20 which may be supported by a front wall 21 and a rear wall 21a. Mounted on the longitudinal midsection of wall 20 are a plurality of spaced supports 22 for a bus bar 23. Each support 22 comprises a post 24 made of heat resisting, insulating material. Each post 24 is attached to table 20 by means of a screw 25 extending through a vertical opening 26 in the table. At the underside of each post 24 is a socket 27 in which is embedded an internally screw threaded sleeve 28 to which the upper end of screw 25 is screwed. At the underside of table 20 is a recess 30, the same being located at the lower end of each vertical opening 26. Screwed to the lower end of each screw 25 is a wing nut 31 located in said recess. At the upper end of each post is a recess 33. Within each recess is a coil compression spring 34. Mounted on the springs 34 is the longitudinal bus bar 23. The bus bar 23 is provided at the edges thereof with folded over lips 23a to engage the upper convolutions of springs 34. The bus bar 23 has an end portion 23b which may be connected in any suitable manner to one terminal of a high frequency or radio frequency current generator.

At the ends of table 20 are rollers or pulleys 40. On the pulleys 40 are spaced similar belts 41. The belts 41 are located on opposite sides of the posts 22. Attached to the belts 41 are spaced cleats 42. The molds 14 are adapted to be conveyed by the belts 41. The cleats aid in conveying the molds. When so conveyed, the lower terminals 17 of the molds contact the bus bar 23.

Means is provided to support the upper runs of the belts 41. To this end there is interposed between the upper and lower runs of each belt 41 a block 45 of heat resistant, insulating material. The blocks 45 may be fixed to table 20 at their outer sides. As illustrated in Fig. 2 of the drawing, there is interposed between each block 45 and table 20 a longitudinal bar 46 of insulating material. On the upper surfaces of each block 45 is another bar 47. The bars 46, 47 as well as block 45 are formed with registering through openings which register with openings 48 in table 20 to receive attaching bolts 50.

Hinged to rear wall 21a as on hinge 51, is a cover 52. Each cover 52 may comprise a top wall 53, a rear wall 54 and a front wall 55. The walls 53, 54, and 55 may be made of metal. Contacting, and attached to, the inner surfaces of said walls are insulating walls 53a, 54a, and 55a, respectively. Attached to the underside of top wall 53a are a plurality of supports 56 for an upper longitudinal bus bar 57. Each post 56 is made of heat insulating electrically resisting material. It is attached to the top wall 53a by a screw 58. Each post 56 is formed on its underside with a recess 59. A the bottom of recess 59 is a socket 60. Embedded in socket 60 is an internally screw threaded sleeve 61. Screwed thereto is a screw 62. Attached to each screw 62 is a coil spring 63. The bus bar 57 is connected to the lower ends of the coil springs 63. Each bus bar 57 has lips 57a at the edges thereof turned over into engagement with the lower convolutions of said springs. The bus bar 57 extends longitudinally of the apparatus and is disposed above the lower bus bar 23.

It will now be understood that as a conveyor belt moves the molds, the upper ram 18 will contact the upper bus bar. Said upper bus bar is provided with an end 57b connected to the other terminal of the high frequency generator. For this reason, the molds passing through the high frequency apparatus 12 will receive high frequency current through the cavity 16 for heating, molding, fusing or curing the articles within said cavity. The cover 52 may be made in longitudinal sections so that each section may be separately lifted.

A heat gauge 65 may be mounted on the cover to project into the chamber 66 formed between the cover and the table 20 so that the operator may ascertain the temperature within said chamber.

The preheater 11 likewise comprises an elongated table 20 and a cover 52 hinged thereto. On the table portion of the preheater 11 is a block 70 of heat insulating, electrically resisting material. The block 70 is supported on the table in any suitable manner. Furthermore, at the ends of the table are rollers 76 supporting a pair of spaced belts 77. The block 70 is interposed between the upper and lower runs of the belt. Block 70 may be provided at the sides thereof with upstanding flanges 78 to serve as guides for the belt. Said block is furthermore formed in the upper surface thereof with a plurality of pairs of sockets 79 in each of which is a coil compression spring 80 supporting a plate 81. Belt 77 is likewise provided with cleats 42 to aid in moving the molds. The molds on the belt 77 slide along plate 81. Beneath each plate 81 are longitudinal heating elements 84 of any suitable type for heating the molds as they pass along plate 81.

Attached to the inner surface of the cover 52 of preheater 11 is a block 85 formed on its undersurface with sockets 86. At the bottom of each socket is a blind opening 87 in which is embedded an internally screw threaded sleeve 88. Screwed to the sleeve 88 is a screw 89. Attached to screw 89 is a coil spring 90. Supported by the pairs of adjacent coil springs 90 is a plate 91. Plate 91 may be fixed to coils 90 in any suitable manner. Block 85 is formed with a surface 93 between sockets 86. Attached to the underside of surface 93 by means of a clamp 94 are a plurality of longitudinally extending heating elements 95. Heating elements 95 heat the upper side of the mold as the mold is conveyed through the pre-heater by the conveyor belts 77.

The post-heater 13 may be constructed substantially similarly to the preheater.

Any suitable means may be provided for transferring the molds from the preheater to the high frequency apparatus, and from the high frequency apparatus to the post heater 13. Fixed between adjacent ends of the belts 77, 41 there may be provided a plate 98 over which the molds are pushed.

Furthermore, a single conveyor belt may be employed for the preheater, high frequency apparatus, and post-heater.

It will now be understood that the molds 14 first pass through the preheater where the mold is heated. The molds then pass through the high frequency apparatus where the material or article in the cavity 16 is subject to high frequency current, and then the molds pass through the post-heater where the molds are retained in heated condition.

It will thus be seen that there is provided an apparatus and process in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A method of molding plastic material comprising preheating a mold containing said plastic material to a temperature at least as high as the molding temperature of said plastic material, subjecting the material within the mold to high frequency current to uniformly and quickly heat the plastic material within the mold to its molding temperature, and subsequently post heating said mold to maintain said mold at the molding temperature of said plastic material for a time sufficient to complete the molding of said material.

2. In apparatus of the character described, in combination top and bottom bus bars connected to the terminals of high frequency current generator, a mold having a mold cavity, and conductors at the upper and lower ends of the mold cavity adapted to engage the bus bars, and conveyor means for moving the mold along the bus bars.

3. Apparatus of the character described, comprising a preheater, high frequency current apparatus adjacent the preheater, and a post-heater adjacent the high frequency current apparatus, means for moving a mold successively through said preheater, high frequency current apparatus, and post-heater, means for heating the mold in the preheater, means for subjecting the mold cavity in said mold to high frequency current in the high frequency current apparatus, and means for heating the mold in the post-heater.

4. High frequency apparatus comprising a base, a pair of spaced belts over said base, a lower bar on said base and between said belts, a cover for said base, an upper bus bar supported by the cover and disposed above the lower bus bar, and means for connecting said bus bar to the terminals of a high frequency current generator.

5. High frequency apparatus comprising a base, a pair of spaced belts over said base, a lower bus bar on said base and between said belts, a cover for said base, an upper bus bar supported by the cover and disposed above the lower bus bar, means for connecting said bus bars to the terminals of a high frequency current generator, and a mold on said belt, said mold comprising a mold cavity, and conductors at the upper and lower ends of the mold cavity contacting said bus bars.

6. High frequency apparatus comprising top and bottom supports, an elongated bus bar resiliently supported on said bottom support, a second bus bar resiliently supported on said top support, a pair of belts on opposite sides of said bus bars, and means to connect said bus bars to a high frequency current generator.

7. High frequency apparatus comprising top and bottom supports, an elongated bus bar resiliently supported on said bottom support, a second bus bar resiliently supported on said top support, a pair of belts on opposite sides of said bus bars, means to connect said bus bars to a high frequency current generator, and a mold on said belts, said mold having an electric insulating body, a mold cavity in the body and conductors at the upper and lower ends of said cavity and contacting said bus bars.

8. High frequency apparatus comprising top and bottom supports, an elongated bus bar resiliently supported on said bottom support, a second bus bar resiliently supported on said top support, a pair of belts on opposite sides of said bus bars, means to connect said bus bars to a high frequency current generator, a mold on said belts, said mold having an electric insulating body, a mold cavity in the body and conductors at the upper and lower ends of said cavity and contacting said bus bars, and cleats on said belt adapted to engage said mold.

9. High frequency apparatus comprising an elongated base of heat resisting, electrical insulating material, a plurality of spaced posts of insulating material on said base, a spring on each post, a bus bar supported on said springs, belts on opposite sides of said bus bar, a cover on said base, said cover having a top wall of heat resisting, electric insulating material, downwardly projecting posts attached to said top wall, springs on said last posts, and a bus bar attached to the last mentioned springs and located above the first bus bar.

10. High frequency apparatus comprising an elongated base of heat resisting, electrical insulating material, a plurality of spaced posts of insulating material on said base, a spring on each post, a bus bar supported on said springs, belts on opposite sides of said bus bar, a cover on said base, said cover having a top wall of heat resisting, electric insulating material, downwardly projecting posts attached to said top wall, springs on said last posts, a bus bar attached to the last mentioned springs and located above the first bus bar, said cover being hinged to said base.

11. High frequency apparatus comprising an elongated base of heat resisting, electrical insulating material, a plurality of spaced posts of insulating material on said base, a spring on each post, a bus bar supported on said springs, belts on opposite sides of said bus bar, a cover on said base, said cover having a top wall of heat resisting, electric insulating material, downwardly projecting posts attached to said top wall, springs on said last posts, a bus bar attached to the last mentioned springs and located above the first bus bar, a mold on said belt, said mold having a mold cavity and conductors at the upper and lower ends of said cavity, contacting said bus bars.

12. High frequency apparatus comprising an elongated base of heat resisting, electrical insulating material, a plurality of spaced posts of insulating material on said base, a spring on each post, a bus bar supported on said springs, belts on opposite sides of said bus bar, a cover on said base, said cover having a top wall of heat resisting, electric insulating material, downwardly projecting posts attached to said top wall, springs on said last posts, a bus bar attached to the last mentioned springs and located above the first bus bar, a mold on said belt, said mold having a mold cavity and conductors at the upper and lower ends of said cavity, contacting said bus bars, and cleats on said belts adapted to engage said mold.

13. High frequency apparatus comprising an elongated base of heat resisting, electrical insulating material, a plurality of spaced posts of insulating material on said base, a spring on each post, a bus bar supported on said springs, belts on opposite sides of said bus bar, a cover on said base, said cover having a top wall of heat resisting, electric insulating material, downwardly projecting posts attached to said top wall, springs on said last posts, a bus bar attached to the last mentioned springs and located above the first bus bar, said cover being hinged to said base, and insulating blocks between the upper and lower runs of said belts.

14. In apparatus of the character described, a preheater, high frequency current apparatus and a post-heater, all arranged in tandem, a mold having a mold cavity, means to convey said mold successively through said preheater, apparatus and post-heater, and means to subject material within said cavity to high frequency current as said mold is conveyed through said apparatus.

15. In apparatus of the character described, a preheater, high frequency current apparatus and a post-heater, all arranged in tandem, a mold having a mold cavity, means to convey said mold successively through said preheater, apparatus and postheater, means to subject material within said cavity to high frequency current as said mold is conveyed through said apparatus, said last means including bus bars in said apparatus connected to the terminals of a high frequency current generator, and conductors on said mold, above and below said cavity, in contact with said bus bars.

16. A method of molding a curable material comprising continuously moving a mold containing the curable material through a preheating zone which will heat the mold to substantially the curing temperature of said curable material, continuing the movement of said heated mold through a zone wherein the material is subjected to high frequency current which will heat the material to a temperature which will initiate the cure of said material and subsequently continuing the movement of said mold through a post heating zone wherein the material is maintained at its curing temperature until said material is cured.

17. A method of molding a curable material comprising the steps of preheating a mold containing the curable material to substantially a temperature equivalent to the curing temperature of said material, then subjecting the material to a high frequency current which will quickly and uniformly heat said material to a temperature sufficient to initiate the cure thereof and subsequently heating said mold to a temperature and for a period of time which will complete the cure of the material.

18. A method of molding a curable material comprising the steps of preheating a cavity mold containing the material until the inner surfaces of said mold have attained a temperature not less than the curing temperature of said curable material, then subjecting said mold to a high frequency current which will uniformly heat said material to a temperature sufficient to initiate the cure of said material and thereafter heating said mold to at least the curing temperature of said material, and for a period of time which will complete the cure of said material.

19. A method of molding a curable material comprising the steps of moving a mold containing the material between and in contact with opposed heated plates to heat said mold to the curing temperature of said material, then moving said mold between and in contact with opposed high frequency electrodes to quickly and uniformly heat said material to initiate the cure thereof and thereafter moving said mold between and in contact with opposed heated plates to complete the cure of said material.

20. A method of molding a curable material comprising the steps of moving a mold containing the material through a heated zone to heat the mold to the curing temperature of said material, thereafter moving said mold through a high frequency zone to uniformly and quickly heat the material in the mold to said temperature to initiate the cure thereof and subsequently moving said mold through a heated zone to complete the cure of said material.

JON GREGG.

REFERENCES CITED

The following references are of record in the file of this patent:

UNITED STATES PATENTS

| Number | Name | Date |
| --- | --- | --- |
| 1,760,234 | Frederick | May 27, 1930 |
| 2,228,614 | Soubier et al. | Jan. 14, 1941 |
| 2,292,366 | De Wyk, Jr. | Aug. 11, 1942 |
| 2,342,920 | Clark | Feb. 29, 1944 |

FOREIGN PATENTS

| Number | Country | Date |
| --- | --- | --- |
| 276,440 | Great Britian | Aug. 29, 1927 |
| 517,798 | Great Britain | Feb. 8, 1940 |

OTHER REFERENCES

British Plastics Heatronic Moulding, June 1943, Electric Heat Digest.

Modern Plastics, "Progress in Heatronic Molding," El. Heat Dig. (pages 108 to 113 and 160).